April 25, 1933. O. WITTEL 1,905,543
SUPPORTING STRUCTURE FOR THE CASING OF A MOTION PICTURE PROJECTION SCREEN
Filed May 21, 1931 2 Sheets-Sheet 1
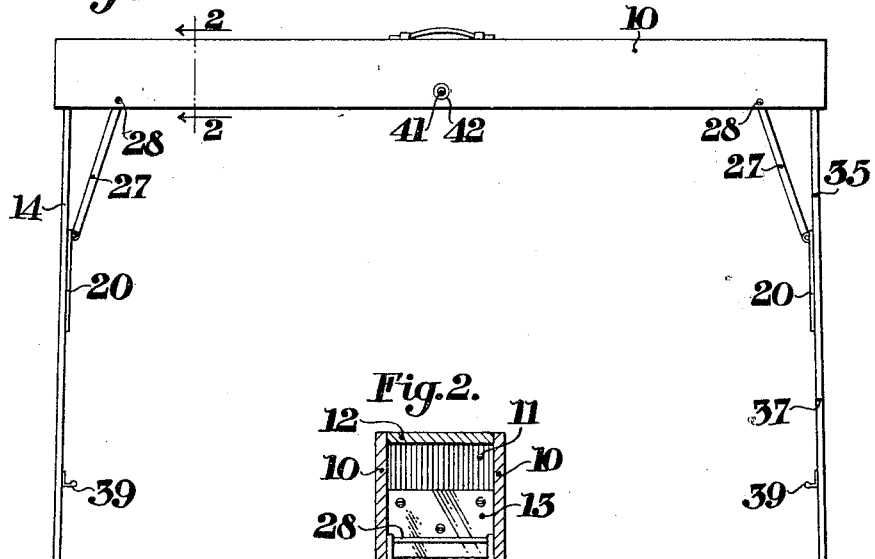
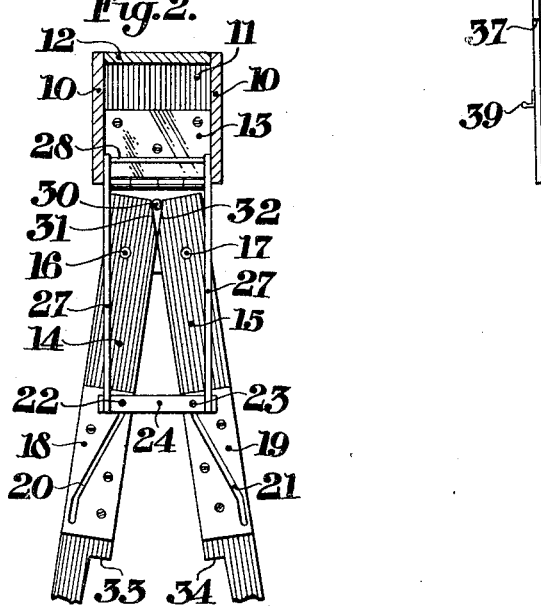
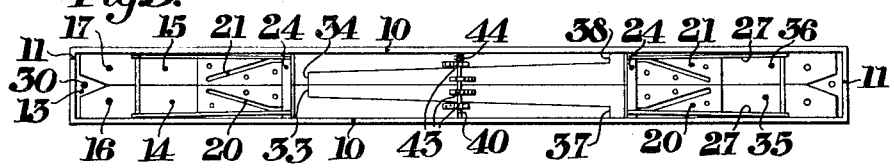
Inventor,
Otto Wittel,
By Newton M. Perris
George A. Gillette, Jr.
Attorneys.

April 25, 1933.　　　　O. WITTEL　　　　1,905,543
SUPPORTING STRUCTURE FOR THE CASING OF A MOTION PICTURE PROJECTION SCREEN
Filed May 21, 1931　　　2 Sheets-Sheet 2
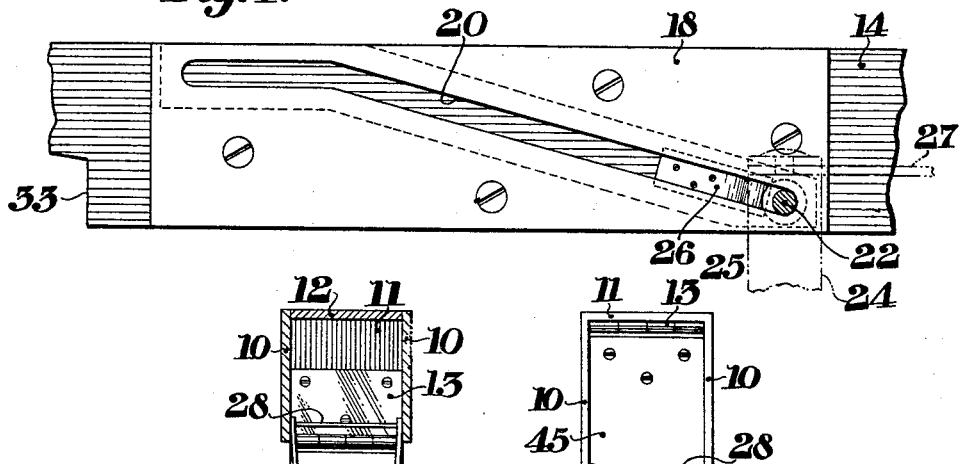
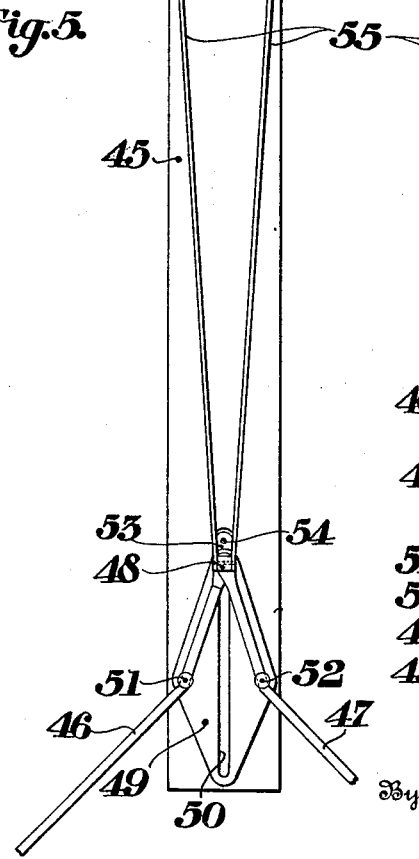
Inventor
Otto Wittel,
By Newton M Perrins
George A. Gillette, Jr.
Attorneys Patented Apr. 25, 1933

1,905,543

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

SUPPORTING STRUCTURE FOR THE CASING OF A MOTION PICTURE PROJECTION SCREEN

Application filed May 21, 1931. Serial No. 539,003.

The present invention relates to a supporting structure for a receptacle and more particularly to a supporting structure for the casing of a motion picture projection screen which in closed or folded position is adapted to form the bottom of the casing for such a screen.

Many receptacles, such as casings for motion picture screens, are intended at times to be supported at a desired height above the ground or floor level and again, at other times, are intended to rest on a flat standard such as a table. It is highly desirable that the supporting means for such a projection screen casing be readily movable into operative position and also desirable that said supporting means in folded or closed position form the bottom of the casing so that the same may be laid on a flat surface or other support.

The primary object of the present invention is the provision of a casing with a supporting structure readily movable into an open or operative position to support the casing above the ground or floor level and also readily movable into a folded or closed position to allow the casing to rest flatly on a standard, table, or floor.

Another object of the invention is the provision on the casing for a motion picture projection screen of a supporting means including legs which are pivoted into operative position and into closed position by movement of the supporting means.

A further object of the invention is the provision on the casing for a motion picture projection screen of supporting means including pivotally mounted legs which are guided in the pivotal movement thereof by a pin and slot means.

A still further object of the invention is the provision on the casing for a motion picture projection screen of supporting means including legs which are adjacent each other in folded position of the supporting means to form the entire bottom of said casing.

Other objects of the invention will be suggested to those skilled in the art by the following description of the illustrative embodiments of the invention.

The above and other objects of the invention are embodied in a receptacle or casing having a supporting means which is adapted to assume an open or operative position and a folded or closed position, said supporting means in closed or folded position constituting the bottom of the receptacle or casing.

Reference is now made to the accompanying drawings in which like reference numerals designate similar elements and in which:

Fig. 1 is a side elevation of the preferred form of the casing according to the invention, with the supporting means in open or operative position.

Fig. 2 is a vertical cross-section of the casing on the line 2—2 of Fig. 1 and a fragmentary front elevation of the supporting means in open or operative position.

Fig. 3 is a top view of the preferred modification of the casing showing the supporting means in closed or folded position.

Fig. 4 is a detailed view of the slotted plate one of which is provided on each leg.

Fig. 5 is a vertical cross-section of the casing and a front elevation of a modified form of supporting means in open or operative position, and Fig. 6 is a fragmentary top view of said second form of the supporting means in folded position.

In the illustrated embodiments of my invention the casing may be of any suitable form or dimension but is preferably an elongated rectangular casing with sides 10, ends 11 and top 12.

The supporting means in each modification includes two pairs of legs, one pair hinged to each end of the receptacle or casing by means of a hinge 13. For the most part the following description will be confined to one pair of legs since description of the other pair of legs would merely involve repetition.

The supporting means of the modification according to Figs. 1–4 inclusive includes the legs 14 and 15 which are pivotally mounted to hinge 13 by respective pivotal supports 16 and 17. Thus, although the supporting means as composed of the hinge and legs rotates about the axis of the hinge, the legs themselves also rotate about the axes of the pivotal supports 16 and 17. These different rotational movements may be described as being in planes which are perpendicular to each other, the hinge and legs rotating in a vertical plane through the casing and the legs themselves individually swinging in a plane which at all times is perpendicular to the aforementioned vertical plane but which cannot be accurately defined with respect to the casing.

The supporting means also includes a guide means which, in itself, comprises a pin and slot means controlling the movement of the individual legs of each pair in the plane which is perpendicular to the vertical plane through the casing. This guiding means specifically comprises plates 18 and 19 fastened respectively to legs 14 and 15. The plates 18 and 19 are each provided with inclined slots 20 and 21, respectively, said slots converging toward each other as they approach the hinged ends of the legs. Pins 22 and 23 engage respective slots 20 and 21 and are mounted upon a cross bar 24 which has flanged ends for connection of a brace means.

The leg 14, taken as an example of the detailed guide means construction, is gouged out adjacent the slot 20 in plate 18 as indicated by the dotted lines, see Fig. 4. The pin 22 has a head 25 beneath plate 18 which functions to maintain the pin 22 within slot 20 and which also functions to resiliently engage a plate spring 26 and to resiliently maintain the leg 14 in the extreme or operative position. The cross bar 24 with its flanged ends and a brace means are indicated by dot-dash lines in Fig. 4.

The brace means of the aforementioned supporting means includes a pair of braces 27 which are each pivotally connected at one end to each of the flanged ends of cross bar 24 and which are each pivotally mounted on the side 10 of the casing by means of a transverse pin 28 located a suitable distance from the ends 11 of the receptacle.

A stud 30 is mounted on the free half of each hinge 13 and is adapted to abut the bevelled corners 31 and 32 of legs 14 and 15 to assure that each of the legs in a pair will assume identical positions with respect to the free end of the hinge 13.

The complementary formation of the four individual legs forming the two pairs of legs of the supporting means is best seen from Fig. 3. The legs 14 and 15, except for the bevelled corners 31 and 32, have parallel sides for approximately one-third of their length, whereupon shoulders 33 and 34 are formed in respective adjacent edges of the legs and the remaining approximate two-thirds of the legs 14 and 15 are slightly tapered toward the sides 10 of the casing. The individual legs 35 and 36 constituting the pair at the opposite end of the casing are provided, respectively, with shoulders 37 and 38, but these shoulders are on respective opposite edges of the legs 35 and 36, while the remaining portions of these legs are tapered inwardly to the ends thereof. It is quite evident that the formation of these two pairs of legs 14 and 15, 35 and 36 is such that when the legs are in folded position they register with each other to form a whole or complete bottom for the casing.

A fastening means is provided in the casing and on the legs to definitely hold the legs in closed position. Such a fastening means may be of any known construction, but has been illustrated as comprising angled pieces 39 which are located on each of the legs so that said angled pieces 39 will engage a transverse bolt 40 when the legs are in closed position, see Fig. 3. Said transverse bolt 40 is provided with a head 41 within a circular hollow 42 of the casing and is provided with a plurality of integral collars 43 in spaced relation thereon. A spring 44 encircles the bolt 40 between the side 10 of the casing and one of the integral collars 43, to hold bolt 40 in extended or forward position. In this position the integral collars 43 will frictionally engage the angled pieces 39 to hold the legs in closed position. Pressure on the head 41 of bolt 40 will cause said bolt to move transversely through the casing so that angled pieces 39 no longer engage the integral collars 43 of bolt 40 and the legs 14 and 15, 35 and 36, will swing by virtue of the force of gravity into operative position.

It should be quite apparent from the foregoing description of the supporting means for the casing that when the legs, as, for instance, legs 14 and 15, swing downwardly about the axis of hinge 13, that the pins 22 and 23, moving in slots 20 and 21, will also cause legs 14 and 15 to rotate about respective pivotal supports 16 and 17 and spread into operative position. Plate springs 26 under the upper ends of slots 20 and 21 will engage the heads 25 of pins 22 and 23 to resiliently hold them in the upper ends of said slots. The supporting means may be readily moved into folding position by exerting an ordinary pressure on the outside of the pairs of legs so that said legs will swing around the axis of hinge 13 and about the pivotal supports 16 and 17 due to the pin and slot guiding means to arrive in closed position, and in registration with the other legs of the supporting means.

The other modification of the supporting means is illustrated in Figs. 5 and 6. This particular supporting means comprises a pair of flat members 45, each of which are hinged to the free ends of hinges 13 at opposite ends of the receptacle. Flat members 45, when swung into closed position, also constitute the bottom for the casing or receptacle. Legs 46 and 47 are mounted on member 45 and are each composed of two straight portions making an obtuse angle with each other. A pivotal support 48 passes through one end of each leg 46 and 47 to form a pivotal support which is common to both legs. A diamond shaped plate 49 is fastened to member 45 on the free end thereof and is provided with a diagonal slot 50 which is adapted to guide the common pivotal support 48 in a straight line path. Rotatable studs 51 and 52 are mounted near opposite corners on plate 49, are freely rotatable on plate 49, and are adapted slidably to engage respectively the legs 46 and 47. A plate spring 53 is positioned on the lower end of pivotal support 48 and provided with a hole which frictionally engages a roundheaded pin 54, which is mounted in member 45, during the uppermost position of pivotal support 48 to resiliently maintain this particular supporting means in operative or open position.

The brace means in this modification comprises a pair of braces 55 which are pivotally mounted at one end to pivotal support 48 and which are pivotally mounted at the other end to the casing by means of transverse pin 28 which, as before, is displaced a suitable distance from the ends 11 of the casing.

The operation of the supporting means according to this modification will be described hereafter. Upon release of a suitable fastening means for the members 45 the supporting means for the casing will swing downwardly due to the force of gravity and the pivotal support 48 common to the legs 46 and 47 will be drawn by braces 55 through the slot 50 in plate 49 to its uppermost position. This movement of the pivotal support 48 will cause legs 46 and 47 to slide within rotatable studs 51 and 52 which are turned by the swinging movement of the legs. It should be noted that the legs 46 and 47 during the movement of the supporting means to operative position will first slide outwardly through rotatable studs 51 and 52 until the pivotal support 48 reaches a position in line with said studs, whereupon legs 46 and 47 will then slide in the opposite direction through studs 51 and 52 until the pivotal support 48 reaches its uppermost position and is frictionally held in such position by engagement of plate spring 53 with the round headed pin 54. As before, the supporting means is moved into closed position by exerting a slight pressure on the outside faces of members 45 and the movements of the elements of the supporting means are reversed so that all elements are contained within the casing in closed or folded position of the supporting means, see Fig. 7.

Throughout the description of the supporting means for each modification only one pair of legs, guiding means, and brace means has been described. It is obvious, however, that the complete supporting means actually includes two pairs of legs, duplicate guiding means, and duplicate brace means. This omission has been made in the interest of definiteness and clarity since the completion of the supporting means requires only duplication of parts. The appended claims have also been drafted in the same manner, but are to be interpreted and construed as covering the complete structure for supporting the casing.

Since the supporting means for a casing may be modified in many respects not disclosed or described but still function in a manner which is within the spirit of the present invention, this disclosure is to be construed in an illustrative and not in a limiting sense.

Having now particularly described my invention, what I claim and desire to secure by Letters Patent of the United States is:

1. The combination with a casing and a plurality of connecting members attached to said casing and each having a portion rotatable about an axis, of a pair of legs mounted on said portion of each connecting member, each leg being rotatable about an axis transverse to said axis for said portion of each connecting member.

2. The combination with a casing and a plurality of connecting members attached to said casing and each having a portion rotatable about an axis, of a pair of legs mounted on said portion of each connecting member, each leg being rotatable about an axis transverse to and spaced from said axis for said portion of each connecting member.

3. The combination with a casing and a plurality of connecting members attached to said casing and each having a portion rotatable about an axis, of a pair of legs mounted on said portion of each connecting member, each leg being rotatable about an axis transverse to said axis for said portion of each connecting member, and guide means between each pair of legs and said casing for governing the rotation of said legs about their axes.

4. The combination with a casing and a pair of hinged members attached to said casing and having a support rotatable about an axis, of a pair of legs mounted on said support of each hinged member, each leg being rotatable about an axis spaced from and transverse at right angles to said axis for said support of each connecting member.

5. The combination with a casing and a pair of hinged members attached to said casing and each having a portion rotatable about an axis, of a pair of legs pivoted to said portion of each hinged member, each leg being rotatable about an axis transverse to said axis of said hinged member, and guide means including braces pivotally connected at one end and slidably connected at the other end between said legs and said casing for governing the rotation of said legs about their axes.

6. The combination with a casing and a pair of hinged members attached to said casing and each having a portion rotatable about an axis, of a pair of legs pivoted to said portion of each hinged member, each leg being rotatable about an axis transverse to said axis of said hinged member, and guide means including braces pivotally connected at one end to said casing and slidably connected at the other end to said legs for movement of said legs about their axes upon rotation of said portions of the hinged members.

7. The combination with a casing and a pair of hinged members attached to said casing and each having a portion rotatable about an axis, of a pair of legs pivoted to said portion of each hinged member, each leg being rotatable about an axis transverse to said axis of said hinged member and guide means including for each leg a brace pivotally connected to said casing, and pin and slot connections between each brace and each leg.

8. The combination with a casing and a pair of hinged members attached to said casing and each having a portion rotatable about an axis, of a pair of legs pivoted to said portion of each hinged member, each leg being rotatable about an axis transverse to said axis of said hinged member, and guide means including for each leg a brace pivotally connected to said casing, pin and slot connections between each brace and each leg, and a cross bar between the pins engaging the legs of a pair.

9. The combination with a casing and a pair of hinged members attached to said casing and each having a portion rotatable about an axis, of a pair of legs pivoted to said portion of each hinged member, each leg being rotatable about an axis transverse to said axis of said hinged member and each leg being shaped to cooperate with the other legs to form a wall for said casing.

10. The combination with a casing and a pair of hinged members attached to said casing and each having a portion rotatable about an axis, of a pair of legs pivoted to said portion of each hinged member, each leg being movable into open and closed positions about an axis transverse to said axis of said hinged member, and each leg being so shaped as to be adapted to cooperate with the other legs in closed position to constitute one wall of said casing.

11. The combination with a casing having a plurality of walls, of a hinge at each end of said receptacle, a pair of legs pivotally mounted on the free end of each hinge, a plate on each leg and provided with a slot, a pin engaging each slot, a cross bar attached to each pair of pins, and a pair of braces between each cross bar and the casing, whereby each pair of legs is spread at an angle as the same is moved into supporting position.

12. The combination with a casing having a plurality of walls, of a hinge at each end of said casing, a pair of legs pivotally mounted on the free end of each hinge, a plate on each leg and provided with a slot, a pin engaging each slot, a cross bar attached to each pair of pins, a pair of braces between each cross bar and the casing, and plate springs adjacent one end of each slot and adapted to engage each pin whereby said legs are resiliently locked in supporting position.

13. The combination with a casing having a plurality of walls, of hinges at each end of said casing, a pair of legs pivotally mounted on the free end of each hinge, a plate intermediately positioned on each leg and provided with a slot, the slots on said pair of legs converging towards the hinges, a pin slidably engaging each slot and a brace between each pin and said casing.

14. The combination with a casing having a plurality of walls, of hinges at each end of said casing, a pair of legs pivotally mounted on the free end of each hinge and adapted to register with each other in closed position to form the bottom of said casing, and guiding means for said legs to guide the swinging movement of said legs in a plane parallel to said supporting means.

15. The combination with a casing having a plurality of walls, of hinges at each end of said casing, a pair of legs pivotally mounted on the free end of each hinge, formed of straight portions, shoulders, and tapering portions, one pair of shoulders being on adjacent and the other pair of shoulders being on opposite edges of the legs, and adapted to form in closed position a plane bottom for the casing, guiding means adapted to guide the pivotal movement of said legs in a plane parallel to said supporting means during opening or closing thereof and brace means between said casing and said guiding means.

16. The combination with a casing having a plurality of walls, of hinges at each end of said casing, a pair of legs pivotally mounted on the free end of each hinge and adapted to register with each other in closed position to form the bottom of said casing, said legs having beveled corners at the pivotally mounted ends thereof, a stud on each hinge simultaneously abutting both beveled corners of the legs and limiting the spreading movement thereof and guiding means for said legs to guide the pivotal movement of said legs in a plane parallel to said supporting means.

17. The combination with a casing and a pair of hinged members attached to said casing and each having a portion rotatable about an axis, of a pair of legs slidably mounted on said portion of each hinged member, each leg being rotatable about an axis spaced from, transverse and movable with respect to said axis of said portion of each connecting member.

18. The combination with a casing and a pair of hinged members attached to said casing and each having a portion rotatable about an axis, of a pair of legs slidably mounted on said portion of each hinged member, each leg being rotatable about an axis spaced from, transverse at right angles and movable with respect to said axis for said portion of each connecting member.

19. The combination with a casing and a pair of hinged members attached to said casing and each having a portion rotatable about an axis, of plates mounted respectively on each portion and each provided with a slot, a pivoted support mounted upon each of said portions and in sliding engagement with the respective slots in said plates, a plurality of legs pivoted in pairs about each of said pivoted supports, braces between each pivoted support and said casing, and a plurality of studs rotatably mounted and each slidably engaging one of said legs.

20. The combination with a casing and a pair of hinged members attached to said casing and each having a portion rotatable about an axis, of plates mounted respectively on each portion and each provided with a slot, a pivoted support mounted upon each of said portions and in sliding engagement with the respective slots in said plates, a plurality of legs each bent into an obtuse angle and pivoted in pairs about each of said pivoted supports, braces between each pivoted support and said casing, and a plurality of studs rotatably mounted and each slidably engaging one of said legs.

21. The combination with a casing and a pair of hinged members attached to said casing and each having a portion rotatable about an axis, of plates mounted respectively on each portion and each provided with a slot, a pivotal support mounted upon each of said portions and in sliding engagement with the respective slots in said plates, a plurality of legs each bent into an obtuse angle and pivoted in pairs about each of said pivotal supports, braces between each pivotal support and said casing, and a plurality of studs rotatably mounted and each slidably engaging one of said legs adjacent one of said pivotal supports.

22. The combination with a casing and a pair of hinged members attached to said casing and each having a portion rotatable about an axis, of plates mounted respectively on each portion and each provided with a slot, a pivotal support mounted upon each of said portions and in sliding engagement with the respective slots in said plates, a plurality of legs each bent into an obtuse angle and pivoted in pairs about each of said pivotal supports, braces between each pivotal support and said casing, and a plurality of studs rotatably mounted on said plate and each slidably engaging one of said legs adjacent one of said pivotal supports.

Signed at Rochester, New York, this 13th day of May 1931.

OTTO WITTEL.